United States Patent [19]

Gast

[11] 4,394,351
[45] Jul. 19, 1983

[54] DUAL-MONOLITH CATALYTIC CONVERTER WITH SECONDARY AIR INJECTION

[75] Inventor: Richard A. Gast, Southfield, Mich.

[73] Assignee: General Motors Corporation, Detroit, Mich.

[21] Appl. No.: 299,843

[22] Filed: Sep. 8, 1981

[51] Int. Cl.³ .............................................. F01N 3/32
[52] U.S. Cl. .................................. 422/171; 422/176; 422/172; 60/301
[58] Field of Search ............... 422/171, 172, 176, 177, 422/180; 60/301, 307

[56] References Cited

U.S. PATENT DOCUMENTS

| | | | |
|---|---|---|---|
| 1,893,372 | 1/1933 | Kryzanowsky | 422/173 |
| 3,653,212 | 4/1972 | Gast et al. | 60/30 R |
| 3,749,130 | 7/1973 | Howitt et al. | 138/42 |
| 3,964,875 | 6/1976 | Chang et al. | 138/40 |
| 3,996,740 | 12/1976 | Niebylski | 60/299 |
| 4,050,903 | 9/1977 | Bailey et al. | 181/36 C |
| 4,065,918 | 1/1978 | Rifkin | 60/274 |
| 4,182,120 | 1/1980 | Niebylski | 60/274 |
| 4,206,178 | 6/1980 | Oya et al. | 422/176 |
| 4,209,493 | 6/1980 | Olson | 422/176 |
| 4,235,843 | 11/1980 | Tadokoro et al. | 422/171 |
| 4,237,098 | 12/1980 | Roberts | 422/171 |
| 4,238,456 | 12/1980 | Jalbing | 422/172 |

*Primary Examiner*—David L. Lacey
*Attorney, Agent, or Firm*—R. L. Phillips

[57] ABSTRACT

A dual-monolith catalytic converter having upstream and downstream located substrates and a configuration such that the exhaust gas flow is non-uniformly distributed across the upstream frontal areas of each of the substrates and concentrated centrally of such frontal areas. The converter further has a chamber located between said substrates. An air distribution tube having an open end adapted to be connected to the pulsed air supply extends through and across the chamber substantially normal to the exhaust gas flowing between the substrates and terminates with a closed end. The tube within the chamber has a plurality of holes which are sized and spaced along the tube to non-uniformly distribute the pulsed air supply throughout the chamber in a manner to provide a resultant air flow distribution conforming with the non-uniform distribution of exhaust gas. Flow dividers are spaced along the tube and extend substantially parallel to the flow of exhaust gas between the substrates in a manner to partition the chamber into a plurality of discrete channels each open to selected ones of the holes to receive one portion only of the non-uniform distribution of the pulsed air supply and one portion only of the non-uniformly distributed exhaust gas whereby the non-uniform air flow distribution is maintained between the channels while the exhaust gas is flowing between the substrates to prevent the exhaust gas from entering the downstream substrate with an improper mix of pulsed air so that the conversion efficiency of the downstream substrate is maximized.

6 Claims, 35 Drawing Figures

Fig.4 TYPICAL AIRFLOW RATES CALCULATED FOR EQUALLY SPACED, EQUAL-SIZED HOLES

Fig.5 TYPICAL HOLE AREAS CALCULATED TO PROVIDE EQUAL MASS-DISCHARGE RATES

Fig.6 AIRFLOW RATE CALCULATED TO CROSS-CHECK VALUES FROM FIGURES 4 AND 5

Fig.7 EFFECTS OF L/d FOR AN AREA RATIO OF UNITY 1.0

Fig.8 EFFECTS OF L/d FOR AN AREA RATIO OF 1.5

Fig.9 EFFECTS OF L/d FOR AN AREA RATIO OF 2.0

Fig.10 SUMMARY OF EFFECTS OF AREA RATIO FOR AN L/d OF 10

Fig.11 EFFECTS OF AREA RATIO ON THE DISCHARGE ANGLES FOR AN L/d OF 10

Fig.12 INSENSITIVITY OF THE REQUIRED HOLE SIZES TO INLET FLOW RATE FOR SHORT TUBES

Fig.13 INSENSITIVITY OF THE REQUIRED HOLE SIZES TO TUBE DIAMETER FOR SHORT TUBES

Fig.14 CORRELATION WITH A NONDIMENSIONAL HOLE-LOCATION PARAMETER FOR AN AREA RATIO OF UNITY

Fig.15 CORRELATION WITH A NONDIMENSIONAL HOLE-LOCATION PARAMETER FOR AN AREA RATIO OF 2.0

Fig.16 APPROXIMATE DESIGN CURVES FOR SHORT TUBES (L/d=10)

Fig.17 APPROXIMATE DESIGN CURVES FOR SHORT TUBES (L/d=20)

DUAL-MONOLITH CATALYTIC CONVERTER WITH SECONDARY AIR INJECTION

This invention relates to dual-monolith catalytic converters with secondary air injection and more particularly to where the secondary air is inducted by exhaust gas pulsed air supply means.

Many various exhaust gas aftertreatment systems have been proposed for oxidizing unburned hydrocarbons (HC) and carbon monoxide (CO) emitted from automotive internal combustion engines. These aftertreatment systems have, for example, included air injection systems, thermal reactors and catalytic converters with either oxidizing or three-way catalysts. Many of these systems have incorporated an external source of secondary air to supply the oxygen required to complete the desired chemical reactions so that mainly water vapor and carbon dioxide ($CO_2$) reach the atmosphere. In the case of secondary air injection, it is common practice to employ a positive displacement air pump which is driven by the engine and which pumps atmosphere air into either the exhaust ports, exhaust manifold, thermal reactor or catalytic converter.

In the case of catalytic converters, secondary air supply by a positive displacement air pump has been employed both with a dual-bed bead converter as disclosed in U.S. Pat. No. 4,237,098 and a dual-monolith converter as disclosed in U.S. Pat. No. 4,238,456. In recent years, however, the positive displacement air pump has been replaced in some instances by an exhaust gas pulsed air supply system such as disclosed in U.S. Pat. No. 3,653,212 which utilizes inherent subambient exhaust pressure pulsations to induce secondary air flow for the exhaust gas aftertreatment, this patent disclosing such secondary air flow being inducted directly into the exhaust ports. In such an exhaust gas pulsed air supply system, air injection tubes are connected to high speed check valves rather than to an air pump and the check valves allow ambient air to flow to the exhaust ports when the pressure there is subambient but prevent back flow whenever that pressure exceeds ambient.

It is now proposed that the secondary air supply for catalytic converters be provided by such an exhaust gas pulsed air supply system rather than a positive displacement air pump. Insofar as the quantity of air delivered is concerned, it appears that such exhaust gas pulsed air supply whose air supply rates can exceed six percent of engine exhaust flow rate can be applied equally as well to either type converter, i.e. dual-bed bead or dual-monolith with ceramic or metal foil substrates. However, it is believed that the dual-monolith converter would be better adaptable in obtaining the proper air distribution because of its normally smaller upstream frontal area at the substrates and the normally larger space (air injection chamber) between the substrates where the air is best injected. Considering then the current state of the art in dual-monolith converters with said secondary air injection, the air injection tube arrangement disclosed in the aforementioned U.S. Pat. No. 4,238,456 has proven very efficient in commercial use when supplied by a positive displacement air pump. In this commercial converter, air injection is accomplished by an air distribution tube (also referred to as a sparger tube) which has an open end for receiving the air supply, extends through and across the chamber between the monolithic substrates substantially normal to the exhaust gas flow therebetween and terminates with a closed end. Side holes in the tube spaced along the length thereof provide for radial discharge into the exhaust gas flow and in the case of positive displacement air pump supply, uniform air distribution is obtained with one row of holes facing upstream into the exhaust gas flow and two rows of holes facing in opposite directions normal to the exhaust gas flow. The holes in each of the three rows decrease in size toward the closed end so as to deliver substantially equal amounts of air and the holes in all three rows are sized in relation to each other so that the two rows of transversely facing holes deliver substantially equal and separately greater amounts of air than the row of upstream facing holes all as disclosed in the afore-mentioned U.S. Pat. No. 4,238,456. It has been discovered that while such an arrangement operates very efficiently with a positive displacement air pump supply, there occurs a substantial change in the air flow distribution resulting in oxygen deprivation at some of the downstream oxidizing catalyst when the secondary air is induced by a pulsed air supply such as disclosed in the aforementioned U.S. Pat. No. 3,653,212. A primary factor causing this marked difference in the ability of the sparger tube to effect the proper air flow distribution is the difference in flow area requirements between a pulsed air supply and a positive displacement air pump supply.

Before proceeding into the present invention, it is helpful to have a clear understanding of the flow characteristics of various length sparger tubes as well as the environmental factors affecting the relatively short-length sparger tube when used in a dual-monolith converter with exhaust gas pulsed air supply.

For example, for sparger tubes that are very long relative to their diameter such as garden sprinklers, the discharge holes near the closed or dead end of the tube must be sized larger than average for uniform flow distribution because frictional pressure loss decreases the static pressure in the flow direction causing low discharge rates near the dead end if all holes were the same size. In contrast, for short sparger tubes such as the one in the dual-monolith converter in the aforementioned U.S. Pat. No. 4,238,456 in which the frictional effects are negligible, the holes near the dead end must be smaller than average because the velocity in the tube decreases from hole-to-hole, and the resulting pressure recovery causes the static pressure to increase (not decrease) in the flow direction. Moreover, because the fluid in a sparger tube has momentum in the flow direction, the fluid discharges at angles much less than normal to the centerline of the tube, especially from the holes near the inlet or feed end where the momentum is highest. This latter effect causes an undesirable void region in the airflow field outside the tube normal to the first few discharge holes. All of these effects are then aggravated when the total area of the discharge holes is made substantially larger than the flow area of the sparger tube in order to obtain sufficient airflow rates with exhaust gas pulsed air supply; the larger discharge holes drastically lowering the discharge velocities and hence the ability of the air to evenly mix with the exhaust gas. For a given sparger tube diameter, inlet flow rate and fluid temperature, the distribution of the discharge flow rates is determined by the number of holes, the ratio of tube length to tube diameter and the ratio of total discharge hole area to tube flow area. The sparger tubes used in the dual-monolith catalytic converters are relatively short as mentioned earlier and it has been discovered by analysis that for uniform exhaust gas flow distribution across the air injection chamber the distribution of relative flow areas needed to provide corresponding uniform air discharge from all the holes is determined by the area ratio and a non-dimensional hole location parameter but is independent of inlet flow rate, tube diameter or number of holes. Moreover, it has also been discovered by experimentation that there is an inherent maldistribution of the exhaust gas flow across the frontal area of the substrates and in the air injection chamber in converters of the type disclosed in the aforementioned U.S. Pat. No. 4,238,456 and that the exhaust gas flow is concentrated centrally thereof resulting in further oxygen deprivation in the outer area of the downstream catalyst when exhaust gas pulsed air supply is attempted.

The present invention meets the flow area requirements to efficiently use an exhaust gas pulsed air supply while also solving the above exhaust gas flow maldistribution problem in dual-monolith converters like in the aforementioned U.S. Pat. No. 4,238,456. This is accomplished in the preferred embodiment by providing the air distribution tube with three longitudinally extending circumferentially spaced rows of substantially equally spaced holes. Two of the rows of holes face in generally opposite directions transverse but slightly downstream to the exhaust gas flow while the third row faces directly downstream in the exhaust gas flow. A plurality of flow dividers are fixed to the tube at substantially equally spaced distances therealong and extend substantially parallel to the exhaust gas flow between the substrates to partition the air injection chamber therebetween into a plurality of discrete channels each open to holes in all three rows. The air distribution tube is provided with a predetermined (1) length/diameter ratio, (2) total hole area/tube flow area ratio, and (3) hole location and size arrangement so that the pulsed air supply is distributed to the channels in proportion to the respective exhaust gas flow therethrough. The induced air/exhaust gas ratio is thus made uniform in the channels formed by the flow dividers which then conduct these different inducted air/exhaust gas flows without intermixing and thus disproportionate air redistribution to the downstream substrate to ensure against oxygen deprivation and thereby maximize the oxidation conversion efficiency.

These and other objects, advantages and features of the present invention will become more apparent from the following description and drawing in which.

Figure 1:
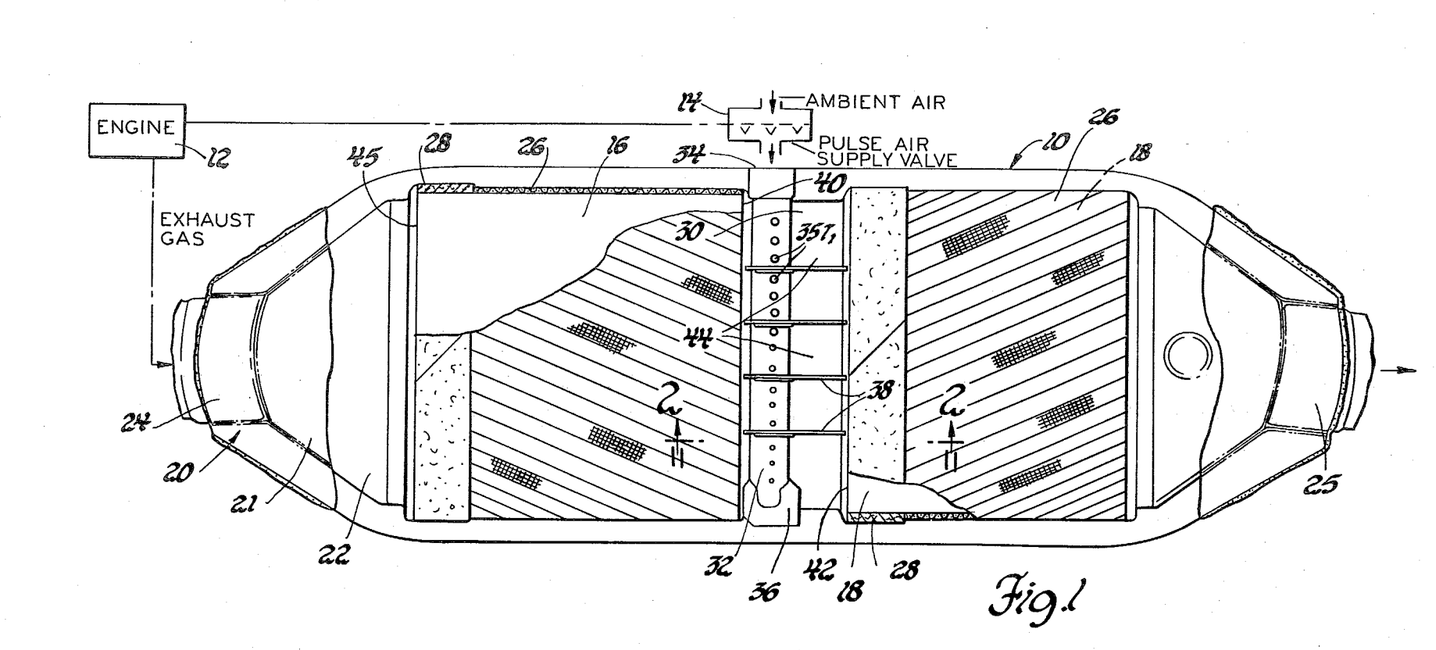
FIG. 1 is a plan view with parts broken away of the preferred embodiment of the dual-monolith catalytic converter with pulsed air induction according to the present invention, this view further including a schematic showing the converter connected with an automotive internal combustion engine having exhaust gas pulsed air supply means providing the pulsed air supply to the converter.
Figure 2:
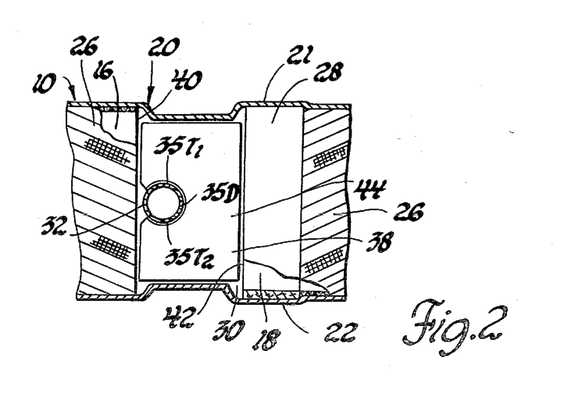
FIG. 2 is a view taken along the line 2—2 showing a cross-section of the air distribution tube and one side of one of the connected flow dividers.

Referring to FIG. 1, there is shown the preferred embodiment of the dual-monolith catalytic converter with pulsed air induction according to the present invention, the converter being generally designated as 10 and adapted to receive the exhaust gas from an automotive internal combustion engine 12 having an air induction valve 14 providing a pulsed air supply for exhaust gas aftertreatment as disclosed in the aforementioned U.S. Pat. No. 3,653,212 which is hereby incorporated by reference. The dual-monolith converter 10 generally comprises a pair of monoliths 16 and 18 which are mounted in-line in a clamshell type housing 20 consisting of a pair of shell members 21 and 22. The shell members 21 and 22 are flange joined along their length and cooperatively enclose the peripheral sides of the monoliths and in addition, have funnel portions at their opposite ends which cooperatively form an inlet 24 and outlet 25 for respectively receiving the raw exhaust gas and expelling the treated exhaust gas. The monoliths 16 and 18 have a substrate made of ceramic, as shown, or possibly metal foil, coated with a suitable three-way or oxidizing catalyst and are supported in the housing by both a wire mesh sleeve 26 and an intumescent sleeve 28 which also serves as a seal. As shown in FIGS. 1 and 2, a chamber 30 is provided in the housing 20 between the monoliths 16 and 18 and air injection into the chamber is provided by an air distribution (sparger) tube 32. The tube 32 has an open end 34 for receiving air, extends through and across the chamber 30 between the substrates substantially normal to the exhaust gas flow therebetween and terminates with a closed or dead end 36. The dual-monolith converter structure thus far described including the mounting of the air distribution tube 32 is like that disclosed in the aforementioned U.S. Pat. No. 4,238,456 which is hereby incorporated by reference.

Describing now the new pulsed air distribution arrangement according to the present invention, the air distribution tube 32 is provided with three longitudinally extending circumferentially spaced rows of equally spaced holes designated as $35T_1$, $35T_2$ and $35D$. The two rows $35T_1$ and $35T_2$ face in generally opposite directions transverse but slightly downstream to the exhaust gas flow through the chamber 30 while the third row $35D$ faces directly downstream in the exhaust gas flow. A plurality of flat-plate flow dividers (baffles) 38 are fixed at right angles to the tube 32 at equally spaced distances therealong and extending parallel to the exhaust gas flow. Each of the flow dividers 38 surround the tube 32 as shown in FIG. 2 and extend to within a few millimeters of the downstream face 40 of the monolith 16 and the upstream face (frontal area) 42 of the monolith 18 to partition the chamber 30 into discrete channels 44 which are each open to a certain number of tubes holes in all three rows $35T_1$, $35T_2$ and $35D$. In dual-monolith converters of the type shown having a diverging entrance to the frontal area 45 of the upstream substrate 16, the exhaust gas non-uniformly distributes across this frontal flow area with the flow primarily concentrated at the center thereof in-line with the inlet 24. The non-uniformly distributed exhaust gas flow leaving the upstream substrate then tends to redistribute in the chamber 30 and produce unpredictable non-uniform air/exhaust gas ratios across the frontal area 42 of the downstream substrate 8 when the air is inducted uniformly thereacross. According to the present invention, the air distribution tube 32 is provided with a predetermined (1) length/diameter ratio, (2) total hole area/tube flow area ratio and (3) hole location and size arrangement so that the pulsed air supply is distributed to the channels 30 in proportion to the respective exhaust gas flow therethrough. The inducted air/exhaust gas ratio is thus made uniform in the channels 30 formed by the flow dividers 38 which then conduct these different inducted air/exhaust flows without intermixing and thus disproportionate air redistribution to the downstream substrate 18 to ensure against oxygen deprivation and thereby maximize the oxidation conversion efficiency in the downsteam substrate.

The parameters of the air distribution tube 32 referred to above enabling the effective use of the pulsed air supply to obtain maximum oxidation conversion efficiency are obtained by analytical/experimental technique as will now be described. Explaining first the analytical approach:

ANALYTICAL ANALYSIS

Two analytical techniques are employed: one to calculate the discharge hole areas required to discharge the same mass flow rate from each hole and another to calculate the flow rate discharged from each hole when all holes have equal area. In describing these staged analyses, reference is made to the analytical illustration of the air distribution tube 32 in FIG. 3 wherein the symbols thereshown together with the others used in the equations to be presented are defined in the following nomenclature:

NOMENCLATURE

A—area, $m^2$
$C_d$—discharge coefficient
d—inside diameter of main tube, m
f—D'Arcy friction factor
$g_c$—gravitational constant = 1.0 kg m/N $s^2$
L—overall length of main tube, m
N—number of axial hole locations
P—gage pressure, Pa
Re—Reynolds number
T—absolute temperature of fluid, K
V—velocity of fluid, m/s
W—mass flow rate of fluid, kg/s
x—axial distance between hole locations, m
α—discharge angle relative to axial flow
μ—dynamic viscosity of fluid, Pa s
ρ—density of fluid, kg/$m^3$

Subscripts d—downstream
h—hole
I—interstage
IN—inlet
t—tube
u—upstream

Both analytical techniques proceed from hole-to-hole in a stepwise or staged manner, first calculating the frictional pressure loss from the upstream position to an interstage position as shown, and then calculating the pressure recovery due to the decreased velocity in the tube downstream of the hole. The flow is assumed to be incompressible, and heat transfer is neglected. It is also assumed that the inlet flow rate ($W_{IN}$) and temperature ($T_{IN}$) to the tube are known. The inlet pressure ($P_{IN}$) is calculated by iteration such that the flow rate in the tube is zero downstream of the last (Nth) hole.

Calculation of Flow Areas

For the first hole, the upstream flow rate ($W_u$) and pressure ($P_u$) are:

$$W_u = W_{IN} \qquad \text{Eq. 1}$$

and:

$$P_u = P_{IN} \qquad \text{Eq. 2}$$

From the continuity equation, the upstream velocity ($V_u$) is:

$$V_u = \frac{\dot{w}_u}{\rho A_t} = V_I = \frac{\dot{w}_I}{\rho A_t} \qquad \text{Eq. 3}$$

where the density (ρ) of air is given by:

$$\rho = \frac{(P_u + 1.0135 \cdot 10^5)}{287\, T_{IN}} \qquad \text{Eq. 4}$$

The interstage pressure ($P_I$) can be calculated by writing the Bernoulli equation along a streamline down the tube, assuming a flow friction factor (f) and no change in flow velocity:

$$P_I = P_u - \frac{f \times \rho V_u^2}{2\, d g_c} \qquad \text{Eq. 5}$$

The friction factor is obtained by a logarithmic curve fit of the published data for turbulent flow in smooth pipes found in R. W. Fox, A. T. McDonald, *Introduction to Fluid Mechanics*, Second Edition, New York, New York: John Wiley and Sons, Inc., 1978, p. 364:

$$\log f = -0.370769 - 0.284467 \log Re \qquad \text{Eq. 6}$$

The Reynolds number (Re) is defined as:

$$Re \overset{\Delta}{=} \frac{\dot{w}_u d}{\mu A_t} \qquad \text{Eq. 7}$$

where the viscosity (μ) of air is obtained from a curve fits of the published data found in J. L. Hobbs, M. L. Lapides, "DATA BOOK, Physical Properties and Flow Characteristics of Air," APEX-527, U.S. Department of Commerce, March 1956, p. 27:

$$\mu = 1.807084 \cdot 10^{-10}(T_{IN})^2 - 1.534582 \cdot 10^{-13}(T_{IN})^3 \qquad \text{Eq. 8}$$

The velocity ($V_h$) of the flow through the hole can be found by writing the Bernoulli equation along a streamline through the hole, neglecting friction and assuming a zero ambient gage pressure:

$$P_I + \frac{\rho V_I^2}{2g_c} = 0 + \frac{\rho V_h^2}{2g_c} \qquad \text{Eq. 9}$$

Thus:

$$V_h = \sqrt{\frac{2g_c P_I}{\rho} + V_I^2} \qquad \text{Eq. 10}$$

For equal discharge from all N holes, the discharge mass flow rate ($\omega_h$) must be:

$$\dot{w}_h = \frac{\dot{w}_{IN}}{N} \qquad \text{Eq. 11}$$

Thus, the downstream flow rate ($\omega_d$) in the tube must be:

$$\dot{w}_d = \dot{w}_I - \frac{\dot{w}_{IN}}{N} = \dot{w}_u - \frac{\dot{w}_{IN}}{N} \qquad \text{Eq. 12}$$

and from the continuity equation, the downstream velocity ($V_d$) is:

$$V_d = \frac{\dot{w}_d}{\rho A_t} \qquad \text{Eq. 13}$$

The pressure ($P_d$) downstream of the hole can now be obtained by once again writing the Bernoulli equation along a streamline down the tube, neglecting friction over the short length encompassing the hole:

$$P_d = P_I + \frac{\rho(V_I^2 - V_d^2)}{2g_c} \qquad \text{Eq. 14}$$

or:

$$P_I - P_d = \frac{\rho(V_d^2 - V_I^2)}{2g_c} \qquad \text{Eq. 15}$$

Because the fluid flowing in the tube has momentum in the axial direction, the flow discharges through the holes at an angle ($\alpha$) to the axial flow. This angle of discharge can be calculated by writing the momentum equation to balance forces in the axial direction:

$$A_t(P_I - P_d) = \frac{1}{g_c}(\dot{w}_h V_h \cos\alpha + \dot{w}_d V_d - \dot{w}_I V_I) \qquad \text{Eq. 16}$$

Substituting Equations 3, 13, 15 into Equation 16 and solving for the cosine $\alpha$ yields:

$$\cos\alpha = \frac{\rho A_t(V_I^2 - V_d^2)}{2\dot{w}_h V_h} = \frac{N\rho A_t(V_I^2 - V_d^2)}{2\dot{w}_{IN} V_h} \qquad \text{Eq. 17}$$

The sine $\alpha$ is then simply:

$$\sin\alpha = \sqrt{1 - \cos^2\alpha} \qquad \text{Eq. 18}$$

Finally the area required for the hole can be calculated by assuming a discharge coefficient ($C_d$) for the hole and writing the continuity equation once again:

$$\dot{w}_h = C_d \rho A_h V_h \sin\alpha \qquad \text{Eq. 19}$$

from which:

$$A_h = \frac{\dot{w}_h}{C_d \rho V_h \sin\alpha} = \frac{\dot{w}_{IN}}{N C_d \rho V_h \sin\alpha} \qquad \text{Eq. 20}$$

For all of the results presented later in this analysis, a discharge coefficient of 0.55 is used for all holes; this being a conservative value obtained as follows. The value of 0.62 generally accepted for a sharp-edged orifice located normal to the flow in a straight pipe was arbitrarily lowered to the value of 0.55 because the flow from the air injection tube must also turn while it discharges. However, it will be understood that a constant value may not be exact for analysis because the holes are so close together that the flow field in the tube cannot redistribute itself between holes, causing the flow field to be different upstream of each hole. On the other hand, an exact analysis is not needed because, unless the exhaust gas flow is uniform across the frontal areas of the substrates, the theoretical area distribution must be modified by experimental iteration as described later. The above procedure (Eqs. 3 through 20) is repeated for each hole by equating the upstream values of pressure, flow rate, and velocity for the next hole to the downstream values of the current hole:

$$P_u = P_d \qquad \text{Eq. 21}$$

$$\dot{w}_u = \dot{w}_d$$

$$V_u = V_d$$

If the downstream flow rate at Equation 12 is zero or less prior to the last hole, the inlet pressure ($P_{IN}$) is decreased, and the procedure is restarted at Equation 3. Conversely, if the downstream flow rate is greater than zero after the last hole, the procedure is restarted at Equation 3 with an increased inlet pressure. As stated earlier, the iteration is terminated when the flow rate downstream of the last hole is equal to zero.

To summarize, the continuity equation is applied three times (Equations 3, 13 and 19), the Bernoulli equation is applied three times (Equations 5, 9 and 14), and the momentum equation is applied only once (Equation 16).

Calculation of Flow Rates

The mass flow rates discharged from the holes, assuming all holes have the same area, are also calculated by the above technique, except that an additional iteration is required for each hole. Equations 1 through 11 are used exactly as above. However, Equation 11 is used only once for each hole to obtain a first estimate of the discharge mass flow rate. In lieu of Equation 12, the downstream mass flow rate in the tube is calculated by:

$$w_d = w_u - w_h \qquad \text{Eq. 22}$$

Then Equations 13 through 19 are used as above. Equation 20 is not used in this technique. If the discharge mass flow rate ($w_h$) calculated at Equation 19 is less than the estimated discharge flow rate used in Equation 22, the estimated flow rate is decreased. Conversely, if the calculated flow is greater than the estimate, the estimate is increased. This procedure (Equations 13–19) is repeated until the difference between estimated and calculated flows is less than a desired tolerance.

When the above iteration for the discharge mass flow rate converges for the first hole, Equations 21 are used to update the values of upstream pressure, mass flow rate and velocity for the next hole, and the above additional iterative procedure is then repeated for each successive hole. The inlet pressure ($P_{IN}$) to the tube is again adjusted by an overall iteration using the same logic as that described above for calculating flow areas.

Trial Calculations

Figure 3:
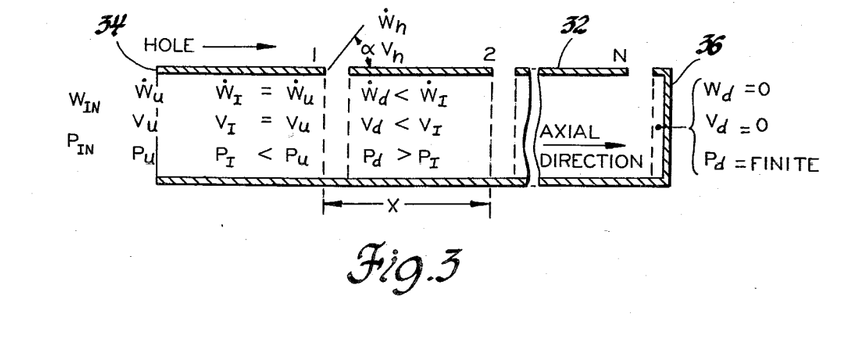
FIG. 3 is an analytical illustration of the air distribution tube extending lengthwise.
Figure 4:
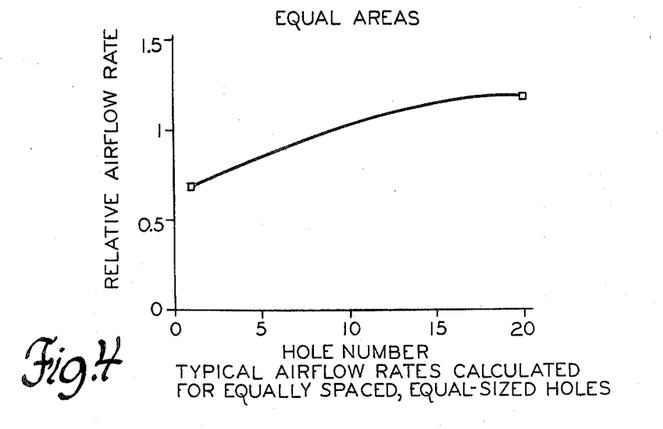
FIGS. 4–17 are graphs illustrating the analytical techniques employed in the design of the air distribution tube.

Discharge flow rates from equal-sized holes are plotted in FIG. 4 for an arbitrary test case with relative flow rate defined as a calculated discharge flow rate divided by the average flow rate and hole numbering started at the feed or inlet end of the tube consistent with FIG. 3. Tube specifications are a 17-mm inside diameter and a 170-mm length with twenty, equally spaced, equal-sized holes providing a total discharge flow area equal to twice the flow area of the tube to accommodate the pulsed air supply whose mass flow rate is assumed as 1.0 g/s of air at a temperature of 500 K. Because frictional effects are negligible for this relatively short tube, the static pressure increases in the direction of flow in the tube, causing most of the flow to be discharged through the holes near the dead or closed end, as illustrated.

Figure 5:
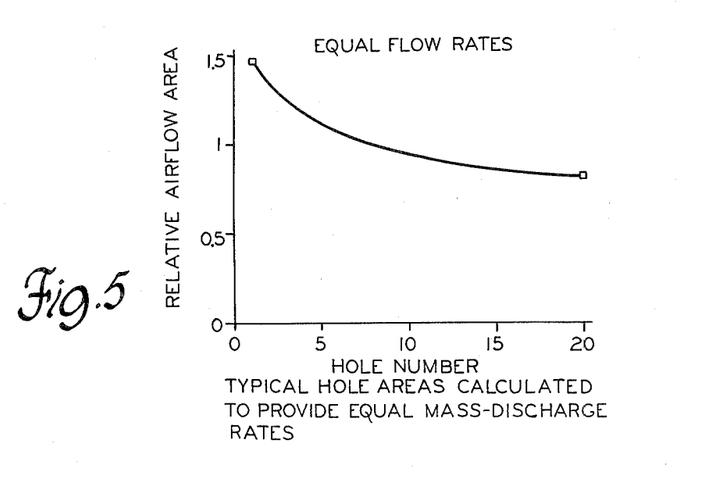
Figure 6:
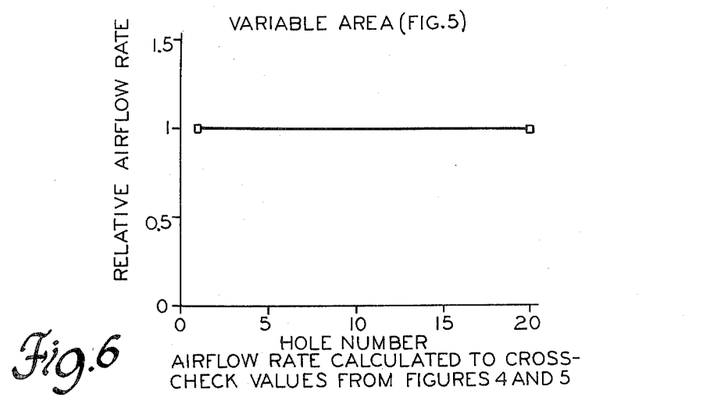

The flow areas calculated to provide equal flow from the twenty holes of the test-case tube are plotted in FIG. 5 with relative flow area defined as a calculated flow area divided by the average area. As expected for this case, the holes near the dead end of the tube must be smaller than average to compensate for the increased static pressure at the dead end. The consistency of the equations and numerical methods of the two techniques is validated by FIG. 6, which illustrates that the discharge flow rates for the test case are calculated to be equal if the flow areas from FIG. 5 are used in lieu of equal flow areas in Equation 19.

RESULTS

Unless otherwise specified, the following results are calculated for the arbitrary values of a 17-mm diameter tube equipped with twenty discharge holes and supplied with air at an inlet flow rate of 1.0 g/s and a temperature of 500 K.

Dominant Parameters

Once the tube diameter and inlet mass flow rate and temperature have been specified, the relative discharge flow rates for equal sized holes are determined by the number of holes and two dimensionless parameters. One parameter is the ratio (L/d) of tube length to tube diameter, and the other is an area ratio defined as the total area of all the discharge holes divided by the flow area of the tube. The effects of these two parameters are illustrated in FIGS. 7, 8 and 9.

Figure 7:
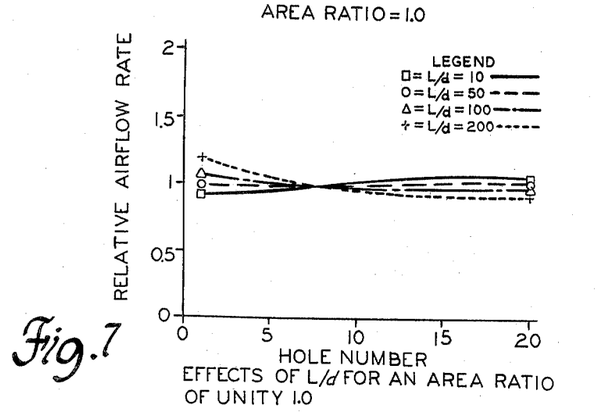
Figure 8:
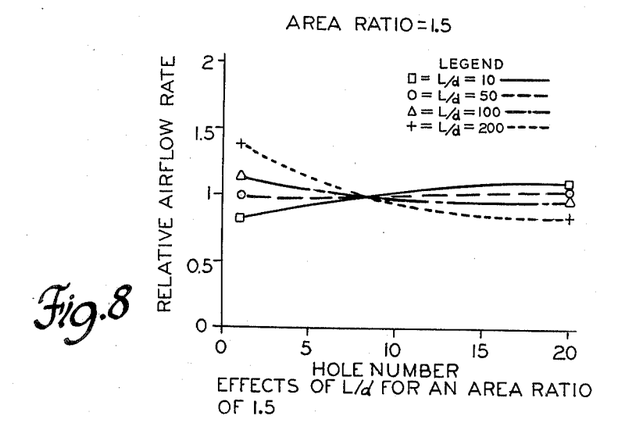
Figure 9:
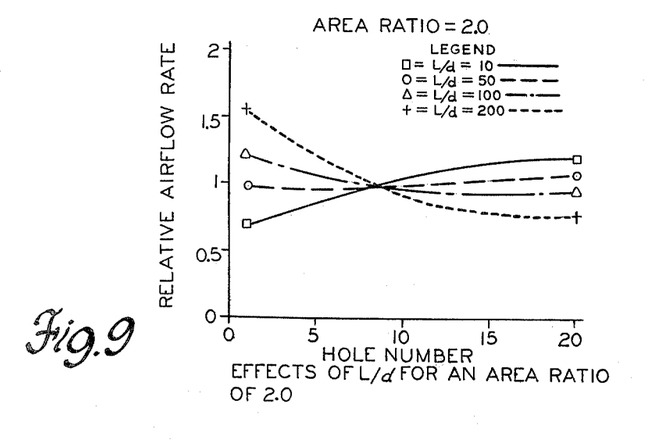

For low ratios of L/d in each of FIGS. 7-9, the flow is seen to discharge preferentially from the holes near the dead end of the tube because pressure recovery dominates frictional pressure loss, as in the above test case. Conversely, for high ratios of L/d, the flow discharges preferentially from holes near the feed end because the frictional pressure loss dominates. Both maldistribution effects are aggravated by increasing the area ratio from a value of unity, as can be seen by overlaying FIGS. 7-9.

Figure 10:
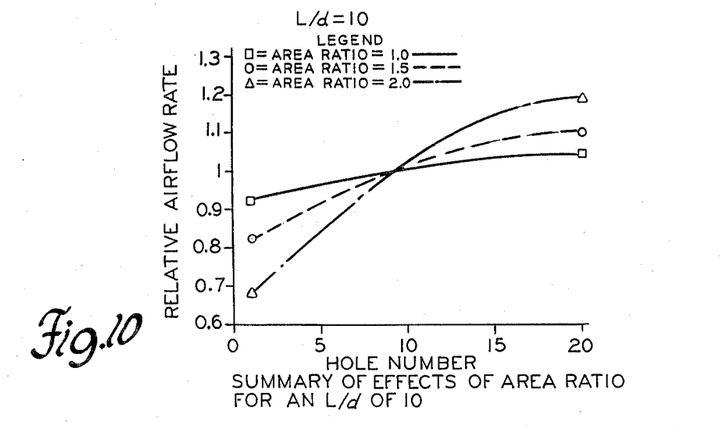

Because sparger tubes for automotive applications will most always be relatively short, the effects of area ratio on flow maldistribution for an L/d of ten are illustrated straightforwardly on an expanded scale in FIG. 10. Comparing the curves in FIG. 10, the starvation for the first hole is found to be less than ten percent for an area ratio of unity, but is increased to more than thirty percent for an area ratio of two.

Discharge Angles

Figure 11:
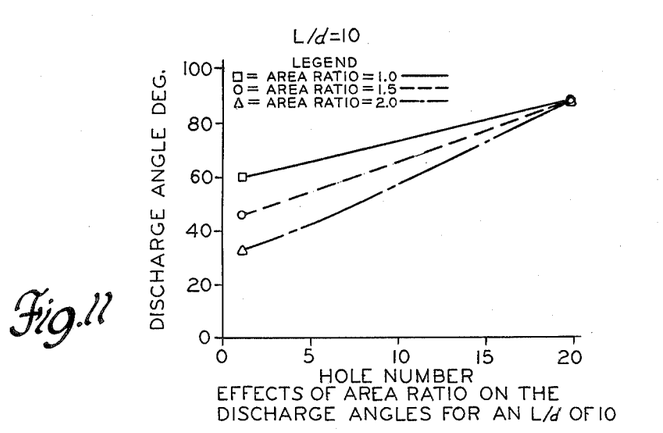

Increased area ratio also aggravates the problem of the flows not discharging normal to the axis of the tube. As shown in FIG. 11, the calculated discharge angles are much smaller for an area ratio of two than for a ratio of unity, especially for the holes near the feed end.

PULSED AIR DISTRIBUTION TUBE DESIGN

Advantages of Short Tubes

Figure 12:
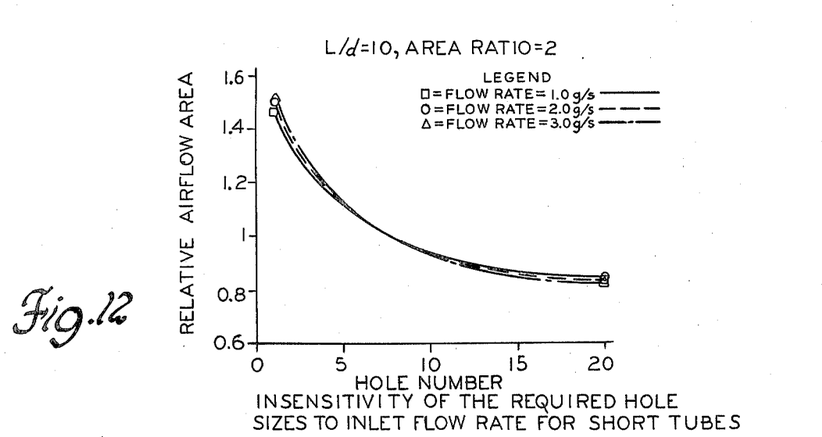
Figure 13:
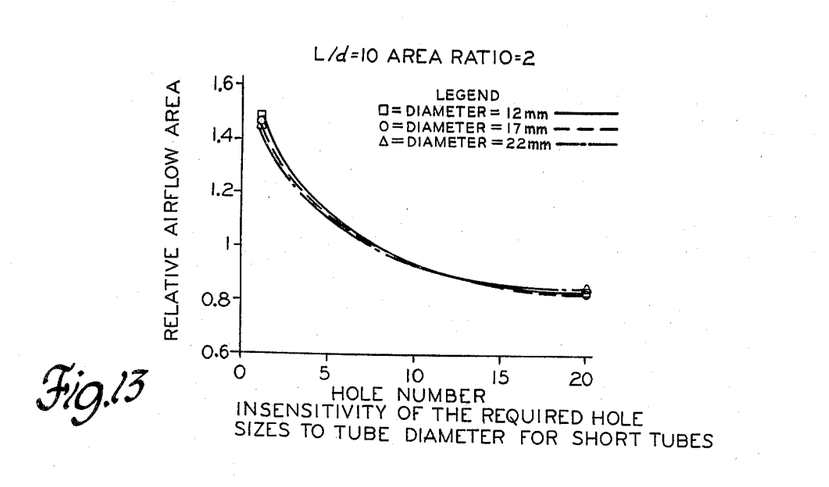

Because frictional effects are negligible, the relative flow areas calculated to provide equal discharge for short sparger tubes are insensitive to both inlet flow rate and tube diameter, even for a large area ratio. These facts are illustrated in FIGS. 12 and 13 for flow rate and tube diameter, respectively. Thus, a given short sparger tube design can be expected to perform well over a broad range of flow conditions, which are typically experienced in automotive applications. Furthermore, only two parameters need to be considered when designing short sparger tubes: the number of holes and the area ratio.

Nondimensional Hole Designation

Figure 14:
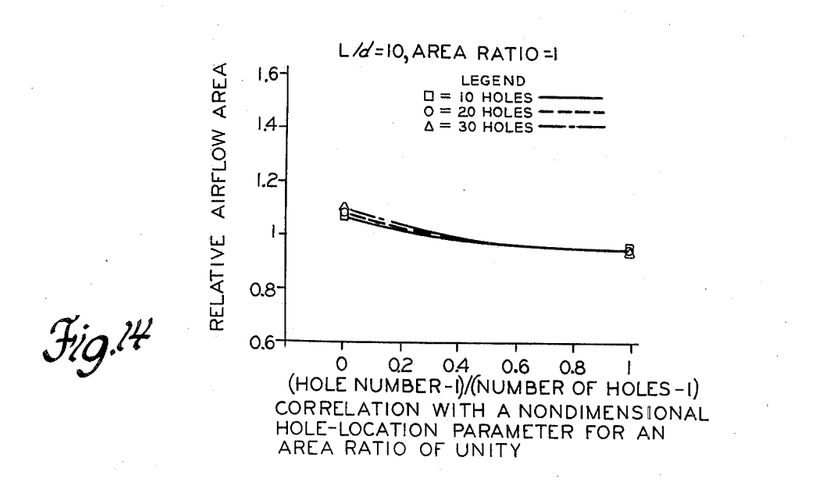
Figure 15:
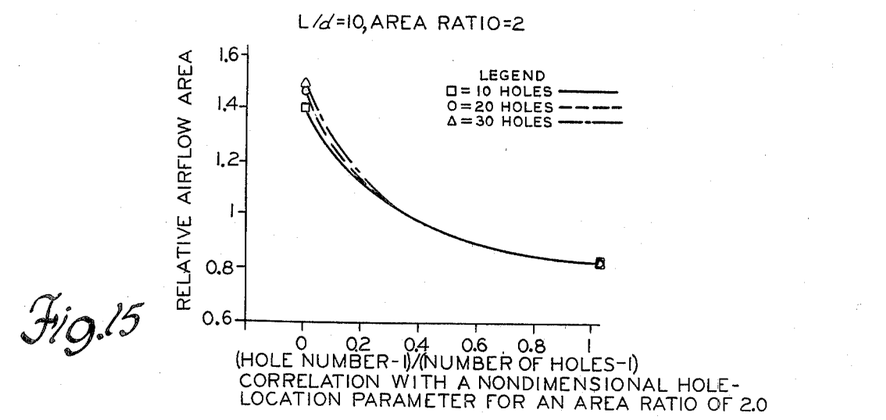

The relative flow areas required for equal discharge through 10, 20 or 30 holes are plotted in FIG. 14 for an area ratio of unity and in FIG. 15 for an area ratio of two. It can be seen that a single correlation is nearly achieved for each area ratio if the hole locations are characterized by the nondimensional parameter: (hole number-1)/(total number of holes-1). An appreciable disparity occurs only for the first few holes when there are fewer than twenty holes providing a high area ratio (FIG. 15). Thus, for most designs, the required flow areas can be determined solely from the nondimensional hole-location parameter and the area ratio.

Approximate Design Curves

Figure 16:
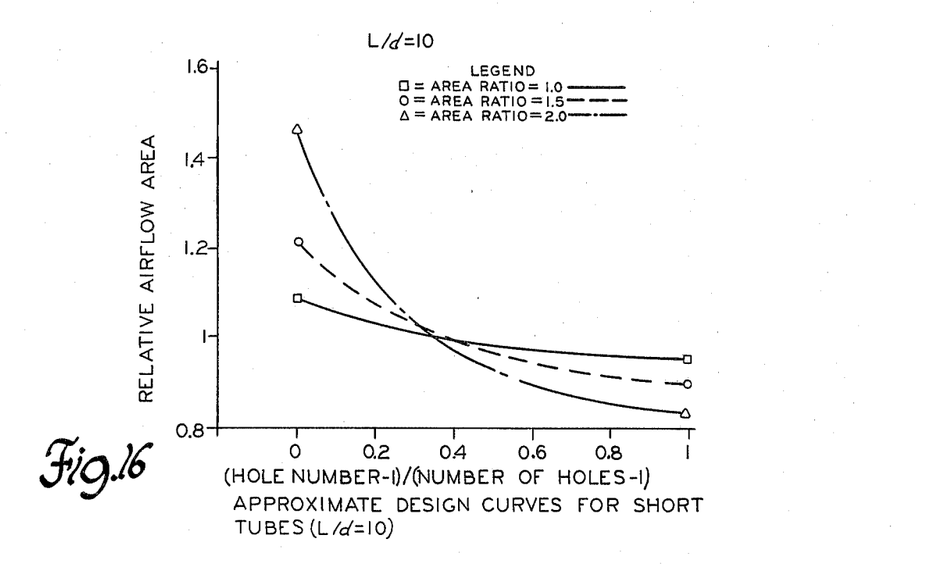
Figure 17:
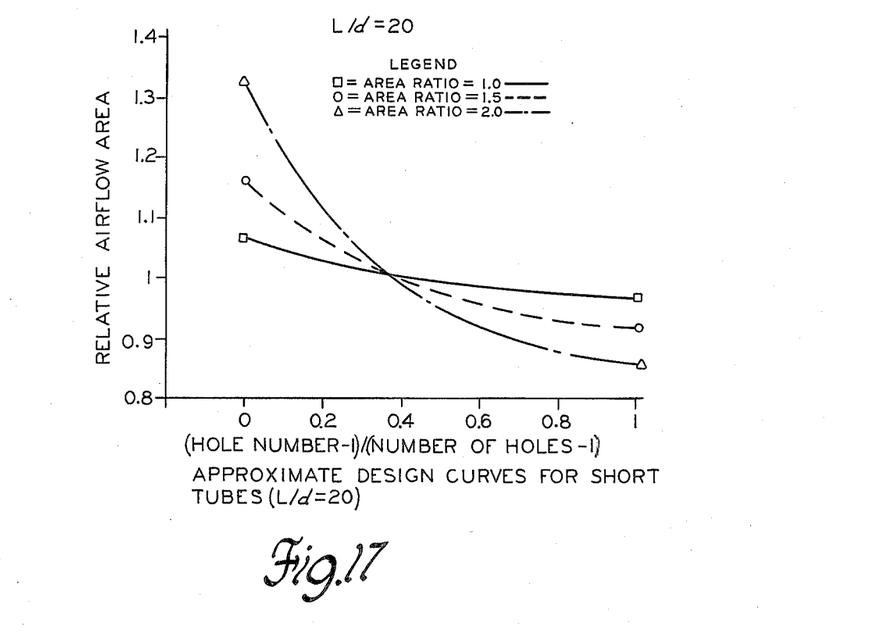

Based on the above simplifications, design curves are plotted in FIGS. 16 and 17 for sparger tubes having an L/d of ten and twenty, respectively. In each case, tube designs are provided for three different area ratios. As discussed earlier (FIGS. 12 and 13), the designs are nearly independent of flow rate, tube size and number of holes. However, for a sparger tube providing a high area ratio with fewer than twenty holes, it is recommended that the procedures presented in the above ANALYSIS be used in lieu of the approximate design curves.

Angular Hole Locations

The rows of holes $35T_1$, $35T_2$ and 35D for the pulsed air distribution tube 32 must be positioned differently from those for an air pump supplied tube because the larger discharge holes required for the pulsed air supply drastically lower the discharge velocities and hence alter the mixing in the air injection chamber 30 as dictated by the continuity equation.

Flow Dividers

The flow dividers 38 overcome a multitude of problems including the fact that the flow from the holes does not discharge normal to the centerline of the tube, and the fact that any inlet flow maldistribution of the exhaust gas will tend to redistribute in the air injection chamber between the substrates (momentum equation). In the experimental iteration presented later, it will be seen that the flow dividers ensure that the discharge from any hole can be assigned to a specific section or channel of the air injection chamber in perfecting the best tube design.

EXPERIMENTAL TECHNIQUE

Figures 18, 19:
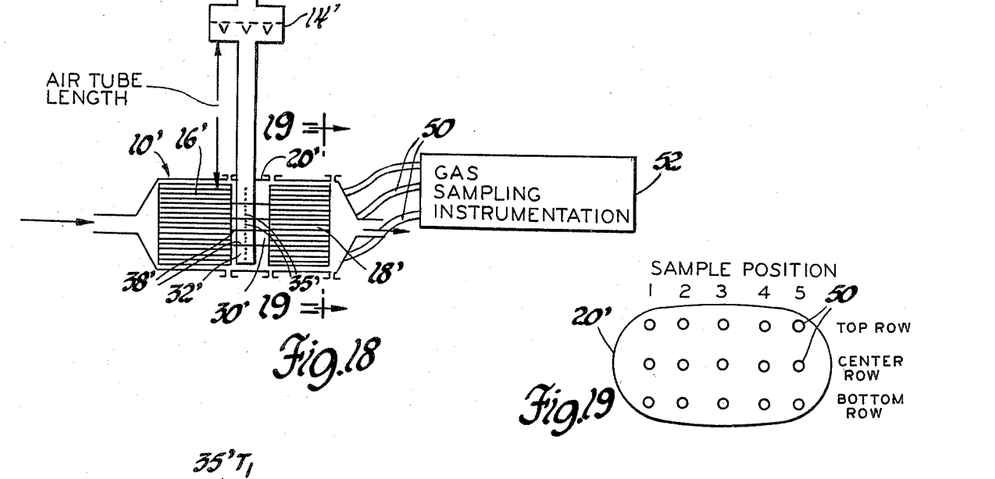
FIG. 18 is a schematic view of an experimental dual-monolith converter for use with pulsed air induction according to the present invention having gas sampling test equipment connected thereto.
FIG. 19 is a view taken along the line 19—19 in FIG. 18 showing the gas sampling locations in the converter.
Figure 20:
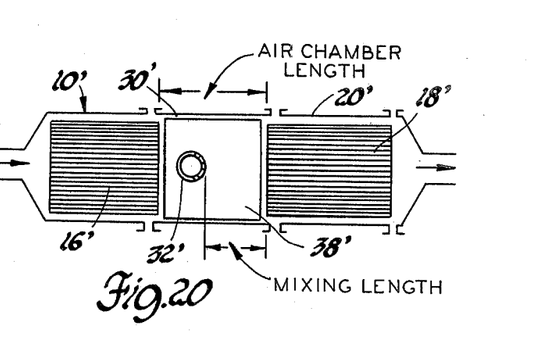
FIG. 20 is a schematic view of the dual-monolith converter for use with pulsed air induction according to the present invention illustrating the air chamber length and mixing length.

In arriving at the final tube design, the performance of various air distribution tubes was assessed using the experimental, take-apart, dual-monolith converter shown schematically in FIGS. 18, 19 and 20 in which parts similar to those shown in FIG. 1 are identified by the same numerals but primed. In the test converter, the section of the housing 20' forming the air chamber 30' was made removable together with the test tube 32' and connected flow dividers 38' to facilitate modifications to the air tube. The outlet section of the converter was also made removable and was equipped with fifteen sampling tubes 50 that were located a few millimeters from the downstream face of the oxidizing monolith 18', and spaced over the elliptical area thereof in three rows of five tubes each as shown and labeled in FIG. 19.

The procedure was to draw samples of exhaust gas individually from each tube for analysis using standard instrumentation 52 to measure hydrocarbons, carbon monoxide, carbon dioxide and oxygen. From this data, air/fuel ratios were calculated using carbon-balance and oxygen-balance techniques, with a goal of obtaining the same air/fuel ratio at each of the fifteen downstream locations. A parameter called "percent dilution" was defined as 100 times the air/fuel ratio at a downstream location divided by the air/fuel ratio at the inlet to the converter (upstream of the point of secondary air addition). This parameter will be plotted in subsequent figures to illustrate the features of the new air tube.

Unless otherwise specified, all tests were conducted at a relatively high engine speed of 2500 r/min and a manifold absolute pressure (MAP) of 59 kPa. Subsequent to determining the air tube specifics that were effective at this condition, performance was evaluated at other test conditions.

DEFINITIONS

Figure 21:
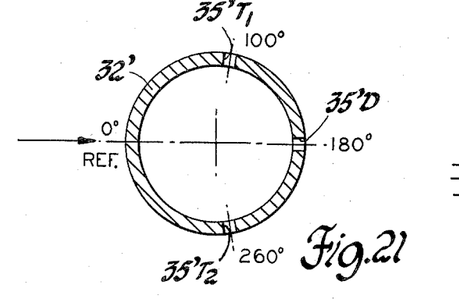
FIG. 21 is an enlarged cross-sectional view of the air distribution tube in FIG. 2 showing the angular locations of the rows of holes.

To aid in understanding the coordinates and legends used in subsequent figures, various definitions are made and shown in FIGS. 18, 20 and 21. The characteristic length of the air distribution tube 32' is shown in FIG. 18 as the distance from the pulsed air supply valve 14' to the nearest discharge hole 35'.

The distance between the two monoliths is defined as the air chamber length, as shown in FIG. 20.

Arbitrarily, as shown in FIG. 21, the leading edge of the tube is defined as the reference point (zero degrees) for defining the angular locations of the rows of holes 35'$T_1$, 35'$T_2$ and 35'D. The other delineated angular locations will be discussed later.

As stated earlier, the area ratio (not illustrated) is defined as the ratio of the total area of all the discharge holes to the flow area of the main tube.

VERIFICATION OF EMBODIMENT

Tube Diameter

Figure 22:
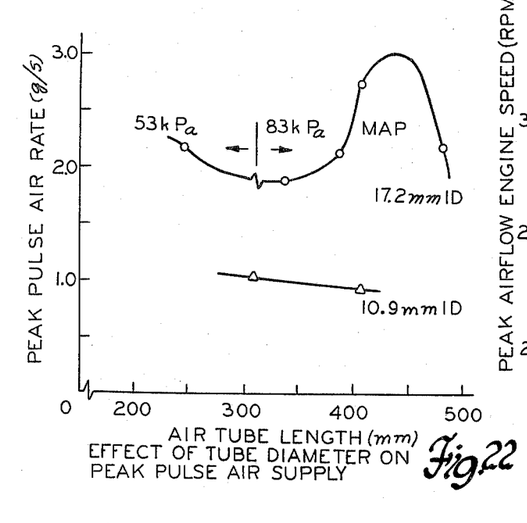
FIGS. 22–34 are graphs showing various test results as described in detail later.
Figure 23:
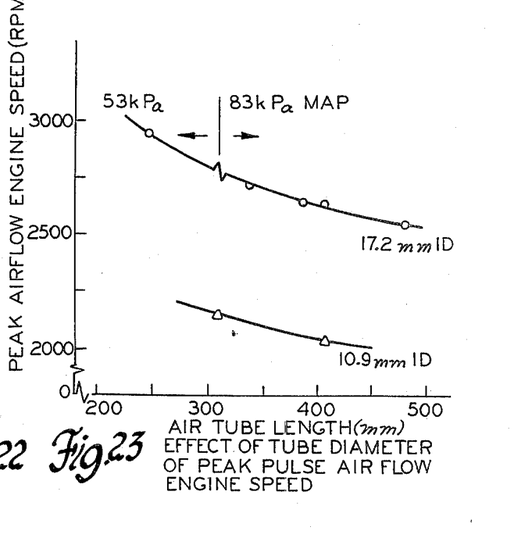

In studying various tube sizes, it was demonstrated that the inside diameter of the air tube must not be smaller than 17 millimeters to obtain sufficient pulsed air flow rates for effective oxygen conversion in the converter in the above arbitrary test case. The pertinent results of this study are shown in FIGS. 22 and 23. As seen in FIG. 22, the peak pulsed air rates with 10.9 mm inside diameter are drastically lowered relative to those with a 17.2 mm inside diameter, especially for the longer air tubes. As an additional detriment, the flow peaks occur at much lower engine speeds with the smaller diameter as shown in FIG. 23, thus making it impossible to obtain sufficient air flow at high engine speeds.

Total Discharge Hole Area (Area Ratio)

Figure 24:
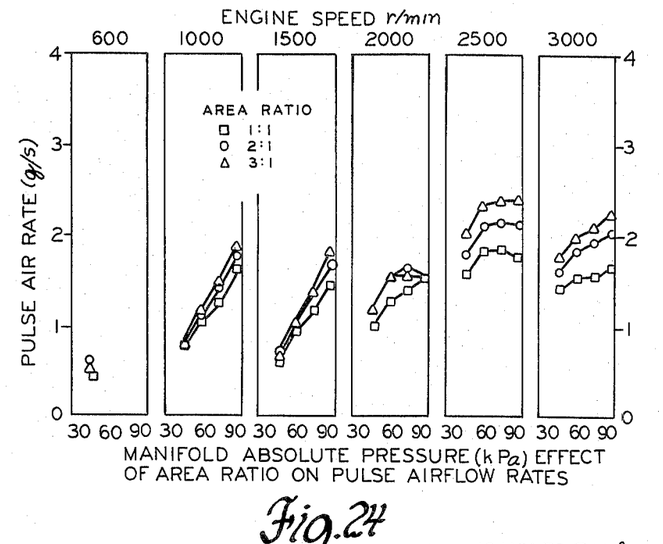

Data from tests using area ratios of 1:1, 2:1 and 3:1 are shown in FIG. 24. In order to provide sufficient air flow, particularly at high engine speeds, it was found that an area ratio of at least 2:1 is necessary. This requires careful attention be paid to both the location and area distribution of the discharge holes, as will be discussed below.

Radial Locations of Rows of Holes

The relatively large discharge holes required to provide the 2:1 area ratio with the pulsed air system cause the discharge velocities from the holes in the air distribution tube to be much lower than those for the air pump tube. As a result, a special test was run to determine the best radial location for a row of holes in order to cause the air to penetrate radially outward toward the top of the converter. This was accomplished by using a tube with a row of holes of about the correct diameter oriented initially at the reference (zero-degree) location (see FIG. 21). The tube was then indexed radially from zero to 180 degrees, as observed visually with a pointer and protractor, while monitoring the oxygen content in the exhaust drawn from the top-row-middle sampling tube (see FIG. 19).

Figures 25, 26, 27:
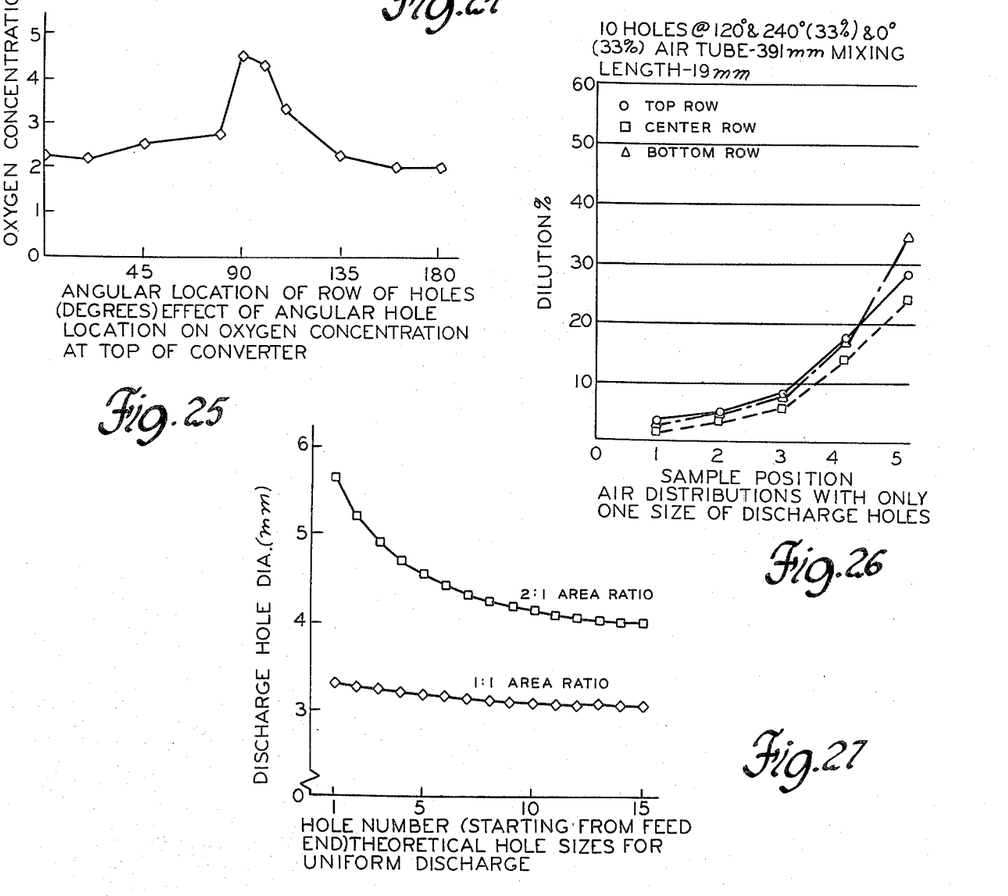

The results are shown in FIG. 25 and clearly indicate that the row of holes should be located at a radial position equal to, or slightly greater than, 90 degrees to be most effective in obtaining high oxygen concentrations near the top of the converter. For this reason, radial positions for the two rows of holes 35$T_1$, 35$T_2$ were selected as 100 degrees and 260 degrees (assuming symmetry), as shown previously in FIG. 21.

The intent at this point in the experimentation was to add a third row of smaller holes at the 180 degree position if insufficient air was subsequently measured at the center row sampling locations.

Axial Hole Size Distribution

To illustrate the need for the proper location and size distribution of the discharge holes, a test was run without flow dividers using three rows of ten equal-sized holes each. With reference to FIG. 21, the rows were oriented with one-third the total disharge area at zero, 120 and 240 degrees. The results are shown in FIG. 26, where the percent dilutions are plotted at the five sampling positions each for the top, center and bottom rows of sampling tubes, corresponding to the schematic in FIG. 19. It can be seen that this tube provided very non-uniform dilutions, with most of the air discharged near the dead end of the tube (sample positions 4 and 5), as expected.

The staged analytical analysis described previously was then applied to calculate the theoretical area distribution for uniform discharge from two rows of fifteen holes each. The results for this theoretical tube and again without flow dividers are shown in FIG. 27 for area ratios of both 2:1 and 1:1. It is apparent that a very large variation in sizes is needed for the 2:1 area ratio. Thus, a smaller number of holes per row is not practicable because the larger holes would be beyond reasonable manufacturing capabilities.

Figure 28:
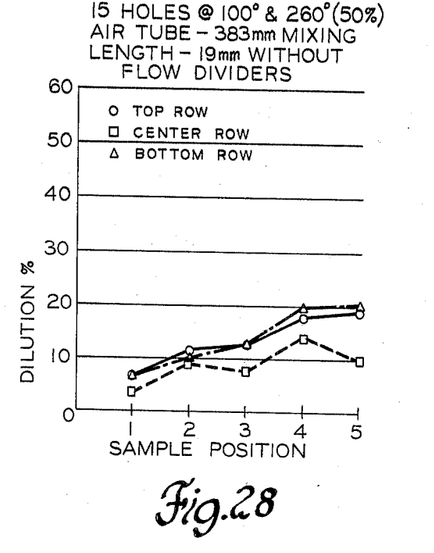

Test results using the above theoretical tube without flow dividers for the 2:1 area ratio are shown in FIG. 28. It can be seen that the dilutions are much more uniform than those with equal-sized holes (FIG. 26), but still not good.

At this point, hole size correction ratios were then used to recalculate the hole size distribution toward uniform dilution. These correction ratios were calculated as follows:

Nomenclature

A/F—air/fuel ratio
$(A/F)_m$—mean A/F after pulsed air
$(A/F)_e$—engine A/F before pulsed air
$(A/F)_i$—average A/F at each of the five gas sampling positions after pulsed air shown in FIG. 19
$\omega_a$—engine mass air rate
$\omega_p$—pulsed air mass rate
$\omega_f$—engine mass fuel rate
$(CR)_i$—corection ratio at each gas sampling position Calculation of Correction Ratios $$(A/F)_m \stackrel{\Delta}{=} \frac{\omega_a + \omega_p}{\omega_f} = (A/F)_e + \frac{\omega_p}{\omega_f} \quad \text{Eq. 23}$$

$$\text{Thus, } \frac{\omega_p}{\omega_f} = (A/F)_m - (A/F)_e \quad \text{Ex. 24}$$

Assuming all the variation among the i sampling positions is in the air, not fuel:

$$(A/F)_i \stackrel{\Delta}{=} \frac{\omega_{ai} + \omega_p}{\omega_f} = \frac{\omega_{ai}}{\omega_f} + \frac{\omega_p}{\omega_f} \quad \text{Eq. 25}$$

$$\text{Thus, } \frac{\omega_{ai}}{\omega_f} = (A/F)_i - \frac{\omega_p}{\omega_f} = \quad \text{Eq. 26}$$

$$(A/F)_i - (A/F)_m + (A/F)_e$$

Then, to calculate the new $\omega_{pi}$ to force $(A/F)_m$ at each location, i:

$$(A/F)_m \stackrel{\Delta}{=} \frac{\omega_{ai}}{\omega_f} + \frac{\omega_{pi}}{\omega_f} = (A/F)_i - (A/F)_m + (A/F)_e + \frac{\omega_{pi}}{\omega_f}, \quad \text{Eq. 27}$$

$$\text{or } \frac{\omega_{pi}}{\omega_f} = 2(A/F)_m - (A/F)_i - (A/F)_e \quad \text{Eq. 28}$$

Thus, the correction ratios $(CR)_i$ are, from Equations 24 and 28.

$$(CR)_i \stackrel{\Delta}{=} \frac{\omega_{pi}}{\omega_f} \bigg/ \frac{\omega_p}{\omega_f} = \frac{2(A/F)_m - (A/F)_e - (A/F)_i}{(A/F)_m - (A/F)_e} \quad \text{Eq. 29}$$

The correction ratios $(CR)_i$ are calculated with Equation 29 by using the five $(A/F)_i$ obtained from the average of the top, center and bottom rows at each gas sampling position where the hole size distribution was calculated from pure theory to provide equal pulsed air discharge from each hole. Then by graphical interpolation, the correction ratio is obtained at each hole location and the hole size distribution is recalculated prescribing the non-equal pulsed air discharge desired.

Figure 29:
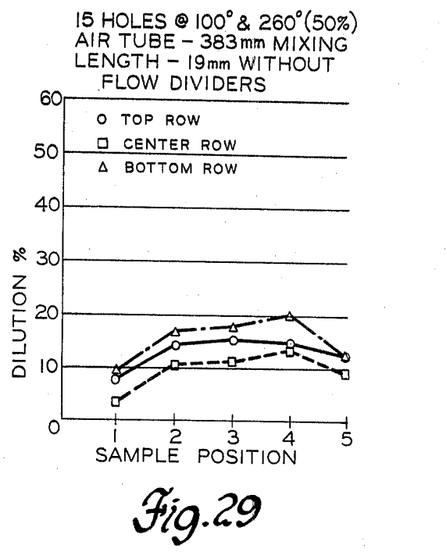

After two iterations with the experimental data from the above theoretical tube in FIG. 28 and recalculating the hole size distribution with correction ratios according to the above procedure, a second test tube was arrived at whose test results are shown in FIG. 29. As can be seen, the curves are somewhat flatter than those in FIG. 28, but the dilutions are too low at the ends of the elliptical area, particularly at position 1. The deficiencies at position 1 are explained by the fact that the flows discharge from the holes near the feed end of the tube at angles less than 90 degrees (see FIG. 11) causing a deficiency of air at position 1 and an excess of air at the central positions. For this reason, four flow dividers were installed to divide the air chamber into five discrete channels.

Flow Dividers (Baffles)

Figure 30:
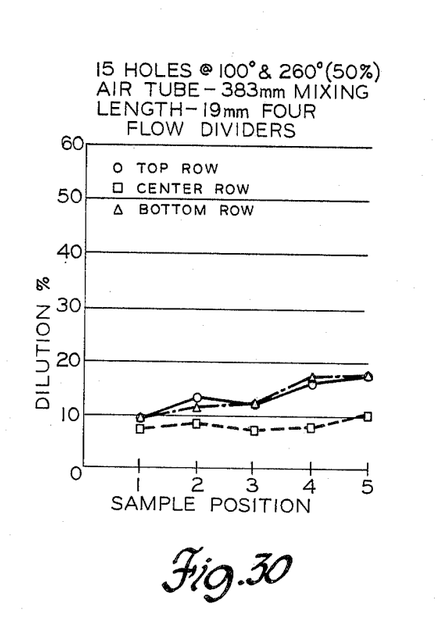
Figure 31:
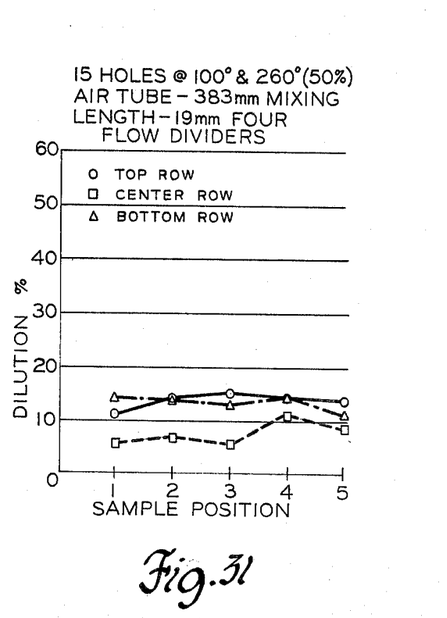

Test results with the four flow dividers added to the theoretical tube in FIG. 28 are shown in FIG. 30. It is noted that the dilutions are more uniform than those for the test tube in FIG. 29 after two iterations without the flow dividers. Furthermore, after just one iteration and with the dividers added to the test tube in FIG. 28, the dilutions were found to be quite flat as shown in FIG. 31. However, these results confirm the need for a row of holes at the 180 degree radial location to increase the dilution at the center of the converter.

Final Design

Figure 32:
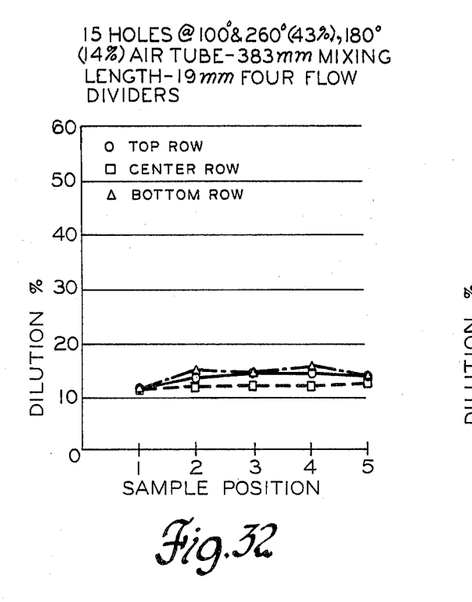

Another test tube was then arrived at after two additional iterations to add a row of smaller holes at the 180 degree location and the test results are shown in FIG. 32 for the 19 mm mixing length used for all the previous test. As indicated, 14 percent of the total discharge-hole area is apportioned to the 180 degree location, with the remaining 86 percent divided equally between the "top" and "bottom" rows. The non-uniformities in the percent dilutions with this tube are probably less than the experimental error. For reference, the final design hole diameters are listed below.

| Discharge Hole Diameters For Final-Design Tube in FIG. 32 | | |
|---|---|---|
| Hole Number* | Top/Bottom Row Diameter (mm) | Center Row Diameter (mm) |
| 1 | 5.42 | 3.09 |
| 2 | 5.20 | 2.97 |
| 3 | 4.96 | 2.83 |
| 4 | 4.75 | 2.71 |
| 5 | 4.58 | 2.61 |
| 6 | 4.44 | 2.53 |
| 7 | 4.32 | 2.52 |
| 8 | 4.16 | 2.37 |
| 9 | 3.85 | 2.20 |
| 10 | 3.57 | 2.04 |

-continued

Discharge Hole Diameters For Final-Design Tube in FIG. 32

| Hole Number* | Top/Bottom Row Diameter (mm) | Center Row Diameter (mm) |
|---|---|---|
| 11 | 3.27 | 1.86 |
| 12 | 3.20 | 1.82 |
| 13 | 3.10 | 1.77 |
| 14 | 3.07 | 1.75 |
| 15 | 2.98 | 1.70 |

*Starting from the feed end.

Mixing Length

Figure 33:
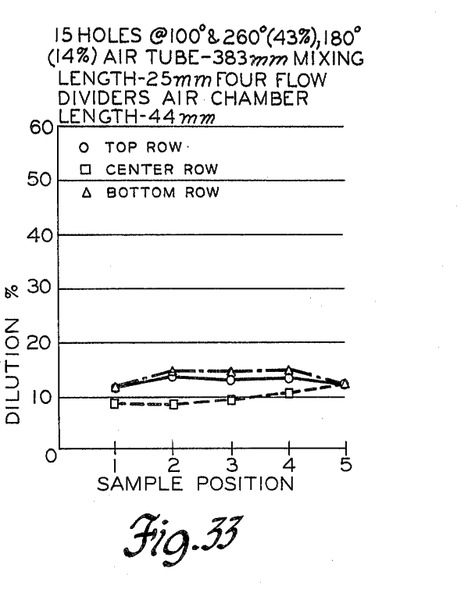

Results using the final-design tube, but with the mixing length increased to 25 mm, are shown in FIG. 33. The apparent increase in dilution at the center sampling row confirms the suspicion that, if the mixing length is not greater than the diameter of the tube, the wake behind the air tube decreases the exhaust gas flow through the center of the downstream monolith. Thus, the optimal design would be to use a mixing length of at least 25 mm and to apportion more than 14 percent of the flow area to the 180 degree radial location. However, this change would increase both the size and mass of the converter used in the tests.

Additional Test Conditions

Figure 34:
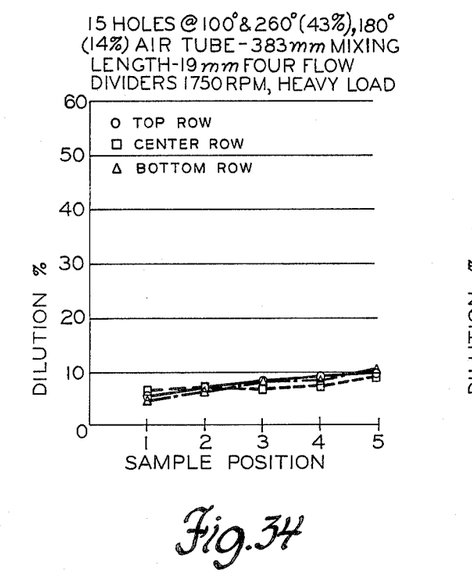

Results are shown in FIG. 34 for the final-design tube tested at an engine speed of 1750 r/min and a MAP of 86 kPa, which is the condition of minimum pulsed air flow for the test engine. It can be seen that, even though the dilutions are much lower than those shown in previous figures, the distributions are substantially uniform. Additional tests showed that the only significant non-uniformities with the final-design tube were obtained at engine conditions where the dilutions were safely higher than needed at all sample positions.

Non-Pulsed Air System

Figure 35:
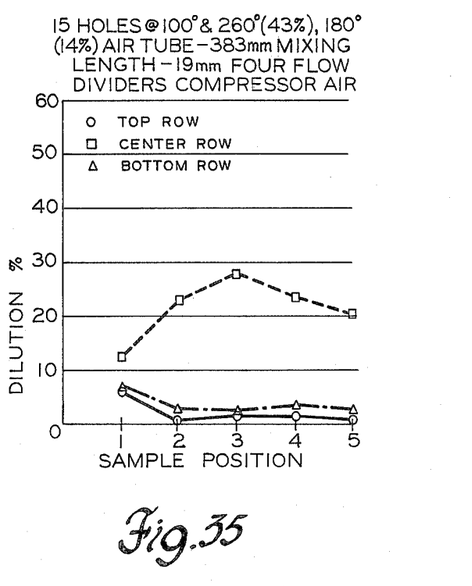

Results are shown in FIG. 35 for a special test using air supplied by an air compressor at a rate somewhat less than that provided by the pulsed air system to obtain the data shown in FIG. 32. It is obvious that, with the non-pulsing air source, most of the dilution air passes through the center of the converter, with very little flow toward either the top or bottom of the air chamber. The explanation for this behavior is that the instantaneous discharge velocities through the large holes near the top and bottom of the air tube are so low with a steady flow, as contrasted to pulsing flow, that there is very little penetration into the exhaust gas flow field.

The above described preferred embodiment and specific actual installation are illustrative of the present invention which may be modified within the scope of the appended claims.

The embodiments of the invention in which an exclusive property or privilege is claimed are defined as follows:

1. For use with an exhaust gas pulsed air supply means providing a pulsed air supply, a dualmonolith catalytic converter adapted to receive exhaust gases and having an upstream located substrate with a catalyst and an in-line downstream located substrate with a catalyst cooperating to purify the exhaust gases, said converter having a configuration such that exhaust gas flow is non-uniformly distributed across the upstream frontal areas of each of the substrates, said converter further having a chamber located between said substrates, an air distribution tube having an open end adapted to be connected to said pulsed air supply and extending through and across said chamber and terminating with a closed end, said tube within said chamber having a plurality of holes which are sized and spaced along said tube such that they nonuniformly distribute the pulsed air supply throughout said chamber in a manner to provide a resultant air flow distribution conforming with the non-uniform distribution of exhaust gas, a plurality of flow dividers spaced along said tube and extending substantially parallel to each other in a manner to partition said chamber into a plurality of discrete channels each open to selected ones of said holes to receive one portion only of the non-uniform distribution of the pulsed air supply and one portion only of the non-uniformly distributed exhaust gas whereby said non-uniform air flow distribution is maintained between said channels while said exhaust gas is flowing between said substrates to prevent the exhaust gas from entering the downstream substrate with an improper mix of pulsed air so that the conversion efficiency of said downstream substrate is maximized.

2. For use with an exhaust gas pulsed air supply means providing a pulsed air supply, a dual-monolith catalytic converter adapted to receive exhaust gases and having an upstream located substrate with a catalyst and an in-line downstream located substrate with a catalyst cooperating to purify the exhaust gases, said converter having a configuration such that exhaust gas flow is non-uniformly distributed across the upstream frontal areas of each of the substrates, said converter further having a chamber located between said substrates, an air distribution tube having an open end adapted to be connected to said pulsed air supply and extending through and across said chamber and terminating with a closed end, said tube within said chamber having a plurality of holes which are sized and spaced along said tube such that they non-uniformly distribute the pulsed air supply throughout said chamber in a manner to provide a resultant air flow distribution conforming with the non-uniform distribution of exhaust gas, a plurality of flow dividers spaced along said tube and extending substantially parallel to each other in a manner to partition said chamber into a plurality of discrete channels each open to selected ones of said holes to receive one portion only of the non-uniform distribution of the pulsed air supply and one portion only of the non-uniformly distributed exhaust gas whereby said non-uniform air flow distribution is maintained between said channels while said exhaust gas is flowing between said substrates to prevent the exhaust gas from entering the downstream substrate with an improper mix of pulsed air so that the conversion efficiency of said downstream substrate is maximized.

3. For use with an exhaust gas pulsed air supply means providing a pulsed air supply, a dual-monolith catalytic converter adapted to receive exhaust gases and having an upstream located substrate with a catalyst and an in-line downstream located substrate with a catalyst cooperating to purify the exhaust gases, said converter having a configuration such that exhaust gas flow is non-uniformly distributed across the upstream frontal areas of each of the substrates, said converter further having a chamber located between said substrates, an air distribution tube having an open end adapted to be connected to said pulsed air supply and extending through and across said chamber and terminating with a closed end, said tube within said chamber having a plurality of holes of various sizes spaced along saide tube, said tube having a predetermined length/diameter ratio and a predetermined total hole area/tube flow area ratio and a predetermined hole size distribution such that said holes non-uniformly distribute the pulsed air supply throughout said chamber in a manner to provide a resultant air flow distribution conforming with the non-uniform distribution of exhaust gas, a plurality of flow dividers spaced along said tube and extending substantially parallel to each other in a manner to partition said chamber into a plurality of discrete channels each open to selected ones of said holes to receive one portion only of the non-uniform distribution of the pulsed air supply and one portion only of the non-uniformly distributed exhaust gas whereby said non-uniform air flow distribution is maintained between said channels while said exhaust gas is flowing between said substrates to prevent the exhaust gas from entering the downstream substrate with an improper mix of pulsed air so that the conversion efficiency of said downstream substrate is maximized.

4. In combination, an internal combustion engine having exhaust gas pulsed air supply means providing a pulsed air supply, a dual-monolith converter having an upstream located substrate with a catalyst and an in-line downstream located substrate with a catalyst for purifying the exhaust gases from the engine, said converter having a configuration such that the exhaust gas flow is non-uniformly distributed across the upstream frontal areas of the substrates, said converter further having a chamber located between said substrates, an air distribution tube having an open end connected to said pulsed air supply and closed at the opposite end and extending centrally through and across said chamber, a plurality of flow dividers fixed to said tube at spaced locations therealong and extending substantially parallel to each other in a manner to partition said chamber into a plurality of discrete channels, said tube having holes open to each of said channels and a predetermined length/diameter ratio and a predetermined total hole area/tube flow area ratio and a predetermined hole size distribution such that the pulsed air supply is non-uniformly distributed by said holes between said channels and across the frontal area of the downstream substrate in substantially the same proportion as the exhaust gas flow distribution in said channels and is thereafter prevented by said flow dividers from being redistributed out of proportion prior to entering the downstream substrate to thereby maximize the oxidation conversion efficiency.

5. In combination, an internal combustion engine having exhaust gas pulsed air supply means providing a pulsed air supply, a dual-monolith converter having an upstream located substrate with a catalyst and an in-line downstream located substrate with a catalyst for purifying the exhaust gases from the engine, said converter having a configuration such that the exhaust gas flow is non-uniformly distributed across the upstream frontal areas of the substrates and concentrated centrally thereof, said converter further having a chamber located between said substrates, an air distribution tube having an open end connected to said pulsed air supply and closed at the opposite end and extending centrally through and straight across said chamber, said tube within said chamber having three rows of axially spaced holes, two of said rows facing in generally opposite directions toward the side of said chamber and the third row facing toward said downstream substrate, a plurality of flow dividers fixed to said tube at substantially equally axially spaced locations therealong and extending substantially parallel to each other in a manner to partition said chamber into a plurality of discrete channels each open to holes in all said three rows, said tube having a predetermined length/diameter ratio and a predetermined total hole area/tube flow area ratio and said two rows having corresponding holes substantially equal in size and substantially larger than those in said third row in the respective channels and the holes in each said row non-uniformly varying in size along the length of said tube such that the holes near said open end have a predetermined substantially larger area than those near said closed end so that the pulsed air supply is non-uniformly and efficiently distributed by said holes between said channels and across the frontal area of the downstream substrate in substantially the same proportion as the exhaust bas flow distribution in said channels and is thereafter prevented by said flow dividers from being redistributed out of proportion prior to entering the downstream substrate to thereby maximize the oxidation conversion efficiency.

6. In combination, an internal combustion engine having exhaust gas pulsed air supply means providing a pulsed air supply, a dual-monolith converter having an upstream located substrate with a catalyst and an in-line downstream located substrate with a catalyst for purifying the exhaust gases from the engine, said converter having a configuration such that the exhaust gas flow in non-uniformly distributed across the upstream frontal areas of the substrates and concentrated centrally thereof, said converter further having a chamber located between said substrates, an air distribution tube having an open end connected to said pulsed air supply and closed at the opposite end and extending centrally through and straight across said chamber, said tube within said chamber having three rows of axially spaced holes, two of said rows facing in generally opposite directions toward the side of said chamber and the third row facing toward said downstream substrate, a plurality of flow dividers fixed to said tube at substantially equally axially spaced locations therealong and extending substantially parallel to each other in a manner to partition said chamber into a plurality of discrete channels each open to holes in all said three rows, said tube having a length/diameter ratio of about ten and a total hole area/tube flow area ratio of about two and said two transversely facing rows having corresponding holes substantially equal in size and substantially larger than those in said downstream facing row in the respective channels and the holes in each said row non-uniformly varying in size along the length of said tube such that the holes near said open end have substantially three times the area as those near said closed end whereby the pulsed air supply is non-uniformly and efficiently distributed by said holes between said channels and across the frontal area of the downstream substrate in substantially the same proportion as the exhaust gas flow distribution in said channels and is thereafter prevented by said flow dividers from being redistributed out of proportion prior to entering the downstream substrate to thereby maximize the oxidation conversion efficiency.

* * * * *